Feb. 14, 1967    G. L. KOEHN    3,303,638
APPARATUS AND METHOD FOR SEPARATING STEM AND LEAVES FROM
GRAPES IN A GRAPE HARVESTER
Filed Jan. 10, 1964    2 Sheets-Sheet 1
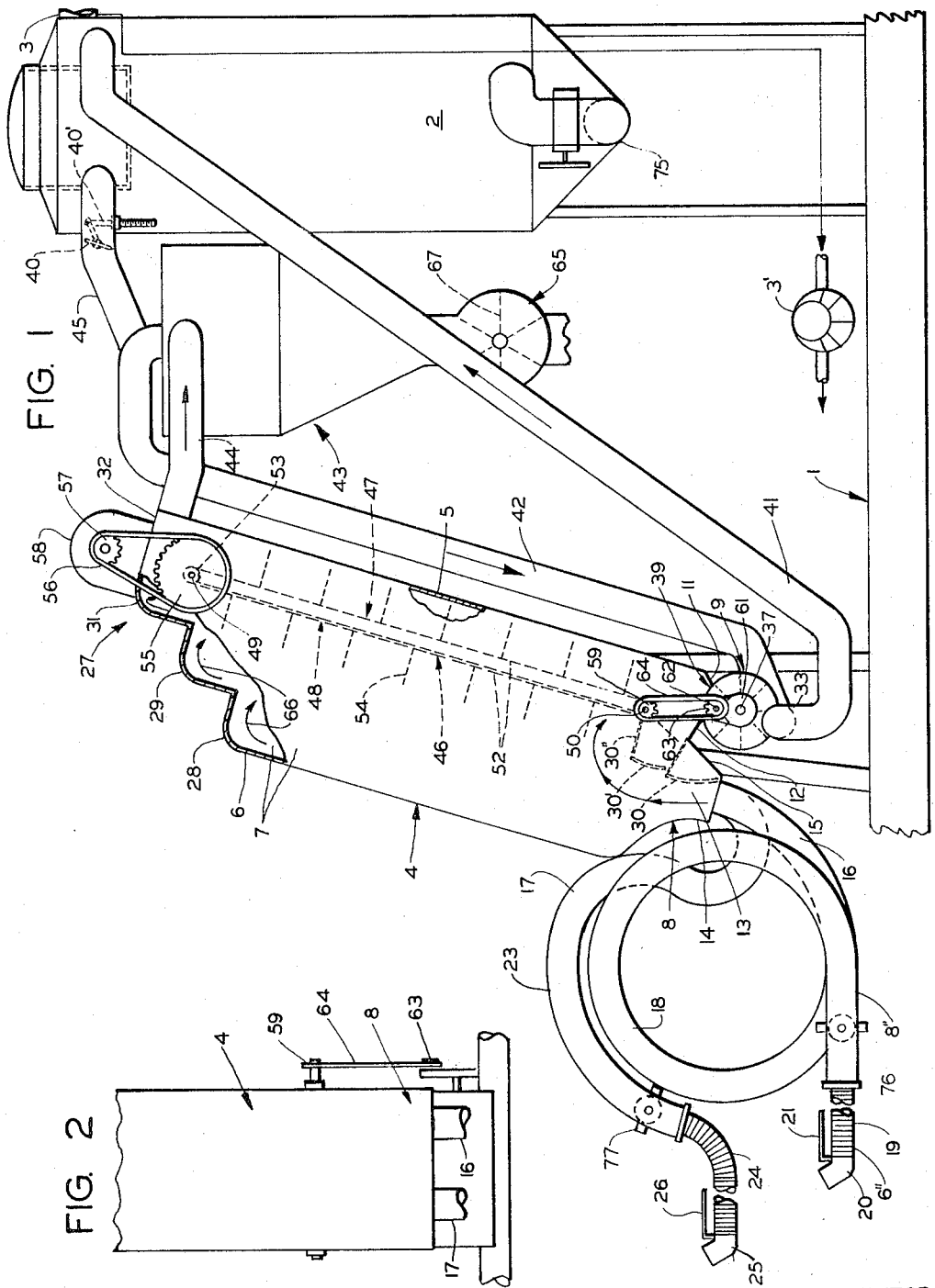
INVENTOR.
GEORGE L. KOEHN
BY
Boylen, Mohler & Foster
ATTORNEYS

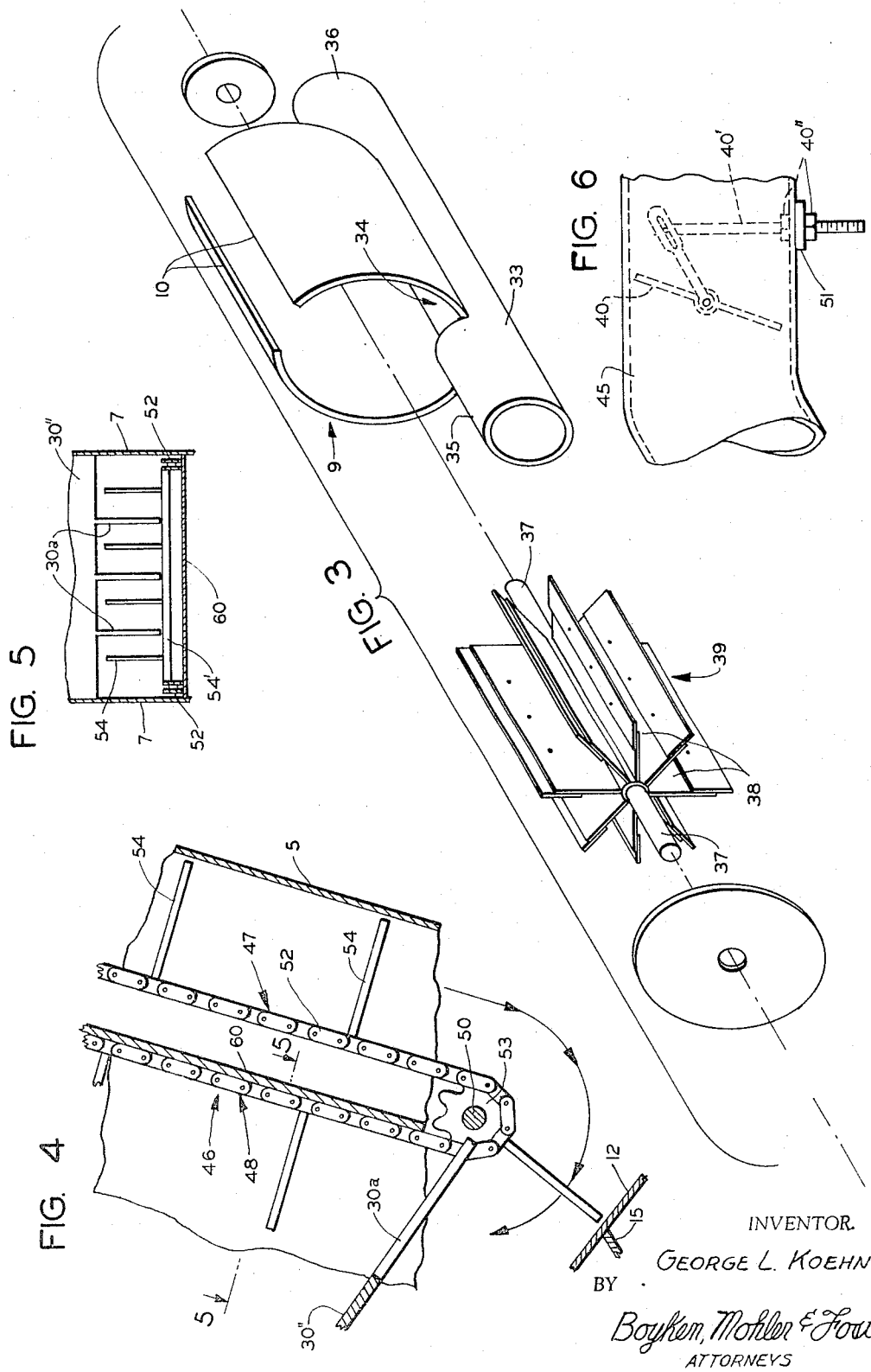

United States Patent Office 3,303,638
Patented Feb. 14, 1967

3,303,638
APPARATUS AND METHOD FOR SEPARATING STEM AND LEAVES FROM GRAPES IN A GRAPE HARVESTER
George Lee Koehn, Livingston, Calif., assignor to E. & J. Gallo Winery, Livingston, Calif., a corporation of California
Filed Jan. 10, 1964, Ser. No. 337,061
14 Claims. (Cl. 56—330)

This invention relates to apparatus for harvesting fruit, and has for one of its objects the provision of apparatus for more efficiently harvesting fruit, such as grapes.

Another object of the invention is the provision of improved means for effecting a more efficient removal of leaves and stems from the grape berries than heretofore.

A still further object of the invention is the provision of an improved method of harvesting grapes for use in making wine.

The grape harvesting apparatus shown in copending application for United States Letters Patent, Serial No. 204,108, filed June 21, 1962, by Joseph E. Gallo, and now Patent No. 3,233,396 may, to a substantial extent, be employed in combination with the present invention. In said application apparatus was disclosed as being supported on the chassis of a suitable vehicle for movement of the latter along rows of grape vines. A vacuum tank was mounted on the chassis, as well as suitable means for maintaining a partial vacuum within the tank. Conduits for conducting the grapes from the vines into the vacuum tank were provided, each conduit having a suction nozzle on its outer end adapted to withdraw the grapes of the bunches from the vines, and the opposite end of each conduit communicated with the interior of the vacuum tank. Thus the grapes or berries separated from the vines were drawn through the conduits and discharged into the vacuum tank under the influence of the partial vacuum within the tank and conduits.

The foregoing elements are employed in the present invention. However, the present invention incorporates a leaf and stem separating means between the suction nozzles and the vacuum tank, which efficiently removes the leaves and stems that may enter the nozzles with the grapes, so that substantially only the grapes will enter the vacuum tank. By the present arrangement, the grapes are kept under a partial vacuum in the vacuum tank and are under a partial vacuum from the time they are picked. The separation of the leaves and stems, as well as other material foreign to the grapes themselves, from the grapes and maintaining the grapes, when so separated, under the influence of the partial vacuum that previously functioned in the separation of the leaves and stems from the grapes, constitutes an improved method, as does the arrangement for carrying out the method.

Other objects and advantages will appear in the description and drawings.

FIG. 1 is a part diagrammatic view of the present grape picking system, including a side elevational view of the leaf and stem separating portion, with certain parts thereof indicated in dotted lines and broken away in parts to show structure.

FIG. 2 is a fragmentary rear elevational view of a portion of the separator.

FIG. 3 is an exploded view of the elements of the lower portion of the leaf and stem separating device.

FIG. 4 is a fragmentary elevational view of the lower end of a flight conveyor that is indicated in dotted lines in FIG. 1.

FIG. 5 is a reduced size, fragmentary, cross-sectional view taken along line 5—5 of FIG. 4.

FIG. 6 is an enlarged, fragmentary elevational view of a portion of one of the pipes or conduits showing a valve therein in dotted line for controlling the flow of air in the conduit.

Hereafter, where the words "rear," "rearwardly," "forward" and "forwardly" and words of similar connotation are used, they are intended to refer to positions or movements relative to the normal direction of movement of the chassis over the ground. Thus, an element positioned rearwardly relative to another is positioned nearer to the rear or trailing end of the chassis. In FIG. 1 the right hand end is the leading end and the left hand end is the rear or trailing end.

In detail, the numeral 1 (FIG. 1) generally designates the chassis of a conventional vehicle, such as a motor driven vehicle or a trailer. The aforesaid application for Letters Patent illustrates one such vehicle, and on such chassis is supported a vacuum tank, or receptacle, 2, which tank is connected by a conduit 3 with any suitable means, such as the pump shown in said application, for exhausting air therefrom, which pump may be said to be the source of vacuum, and which is schematically shown in FIG. 1 and designated 3'. This tank 2 is the one that will receive the grapes or berries that are removed from the vines.

At the rear end of chassis 1, and preferably rearward of tank 2, is the leaf and stem separator, or segregator, generally designated 4, the main function of which is to segregate the grapes from the leaves and stems that may enter the system, and to conduct the grapes to tank 2, while moving the leaves to another point for discharge from the system.

The separator 4 illustrated in FIG. 1 comprises a vertically elongated housing that is generally rectangular in horizontal cross section, having a front wall 5, rear wall 6 and opposed side walls 7. The housing is inclined forwardly from its lower to its upper end, and the lower end comprises a downwardly projecting portion 8 that is adjacent to the lower end of the rear wall 6, while forwardly thereof, and at a slightly lower level is a generally cylindrical, horizontally disposed portion 9 that extends between the lowermost and downwardly projecting portions of side walls 7.

The upper side of the cylindrical portion 9 is formed with a slot 10 (FIG. 3) extending longitudinally thereof between said side walls, which slot forms an inlet generally opening upwardly into the housing 4. The walls of said cylindrical portion 9 may be said to define a portion of the lower end wall of the housing 4, since a flat wall section 11 (FIG. 1) of the lower end of housing 4 is welded or otherwise suitably secured to the cylindrical portion 9 along the forward edge of slot 10, and extends slantingly upwardly and forwardly from said forward edge, while a lower wall portion 12 is similarly secured to portion 9 along the rear edge of slot 10 and inclines upwardly and rearwardly from said rear edge, and within portion 8 to an upwardly extending baffle, as will later be explained.

The downwardly projecting portion 8 of the housing 4 is defined by vertical, opposed side walls 13 that may be downward extensions of the walls 7 of the housing, and by a downwardly and forwardly extending portion 14 of rear wall 6, and a lower wall section 15 that extends slantingly downwardly and rearwardly from the upper edge of the lower wall section 12.

A pair of suction conduits 16, 17 connect at one of their ends with, and open upwardly into the housing 4 at the lower side of the downwardly projecting portion 8. These conduits preferably open into said portion 8 at horizontally spaced points in a lower wall that closes the lower side of said portion 8.

Conduits 16, 17 are of relatively large diameter, and conduit 16 is formed to provide a vertically disposed loop or coil 18 that extends upwardly relative to the end of the conduit that connects with the lower portion 8 of housing 4. From its point of connection with portion 8, said loop or coil 18, in succession, extends downwardly, rearwardly, upwardly, forwardly, downwardly and then rearwardly with the latter rearwardly extending end being connected with one end of a flexible conduit 19 of less diameter than the diameter of conduit 16 (8") and coil 18 thereof, to prevent excess loss of vacuum at the nozzle. The rear end of conduit 19 that is remote from coil 18 is provided with a generally upwardly directed intake or grape receiving nozzle 20. This nozzle is provided with a suitable handle 21 adapted to be grasped by the hand of an operator for manipulating the nozzle to position the open upper end of the latter generally below bunches of grapes that are on the vines.

Conduit 17 extends downwardly from the lower wall of portion 8 and then rearwardly, upwardly and downwardly to form an inverted U-shaped portion 23. This portion 23 extends at an angle relative to the longitudinal axis of chassis 1 or to the path of travel of the vehicle, so as to extend over the row of vines along one side of the vehicle. The loop 18, on the other hand, may extend directly rearwardly from the vehicle so as to be between the pair of rows in which the vehicle is adapted to move.

The end of the inverted U-conduit 23 that is remote from the housing 4 is connected with a generally rearwardly extending flexible conduit 24 that substantially corresponds to conduit 19, and it, in turn, has a grape receiving nozzle 25 on its rear end, which nozzle has a handle 26 thereon for manipulating it in the same manner as nozzle 20 is adapted to be manipulated. By this structure, all of the grapes on a row of vines may be harvested as the vehicle is moved along such row. As one practical example, each of the conduits 16, 17 may be approximately 8 inches in diameter, while each of the flexible conduits may be approximately 6 inches in diameter.

Preferably the coil 18 and U-shaped portion 23 of conduits 16, 17 are preformed and rigid, since they can be substantially stationary on the chassis, while the flexible conduits 19, 24 may be supported in any suitable manner for easy manipulation of the nozzles in positioning them to receive the grapes at opposite sides of a row and at any point in each vine in the row. One such supporting means is shown in the aforesaid application for patent.

It is seen from the foregoing that both the coil 18 and U-portion 23 form an inverted U, except that in the case of the coil the lower end of the U is closed by a continuation of the conduit. These inverted U portions, so provided, perform the function of reducing the velocity of the grapes that are drawn through the conduits and into tank or receptacle 4, and are a feature of this invention.

The upper end wall of housing 4 is of a special contour to provide structure that will preferably result in producing a plurality of eddy currents, which, in turn, will help to prevent grapes from going out of the tank 4 with the leaves, as will later be explained more in detail.

Within the lower portion of housing 4 and between the upwardly opening ends of the conduits 16, 17 and the slot or opening 10 into the cylindrical portion 9 are a plurality of baffle plates 30, 30', 30" (FIG. 1), which plates extend horizontally between the lower end portions of side plates 7. The baffle plate 30 is the lowermost plate, and plate 30' extends upwardly therefrom while plate 30" is along the upper edge of plate 30'. Plates 30, 30' may be disposed, transversely of their horizontal lengths, in generally upwardly and forwardly extending slight arcs from a horizontal line adjacent to and parallel with the lower edge of the lower wall section 15 of the housing 4. The lower wall 12 of the separator extends to baffle 30.

The lower marginal portion of the middle baffle plate 30' is spaced slightly forwardly of the upper marginal portion of the lower baffle plate 30, and in lapping relation to plate 30, while the lower marginal portion of the baffle plate 30" is generally horizontally disposed and extends forwardly and slightly downwardly from the upper edge of the baffle plate 30'.

By the foregoing arrangement a horizontal slot is provided between the adjacent pairs of baffle plates 30, 30' through which juice may drain into the cylindrical portion 9 while the berries go over the upper baffle plate, and some berries may also pass through said slot. The juice and such grapes as pass through the said slot will be directed to cylindrical portion 9 by the lower wall 12.

Where overripe berries are being harvested and there is an over abundance of released juice, a single baffle generally corresponding to baffle 30, but of greater vertical width, may be preferable, since it would drain the juice into the portion 9 but would prevent the juice from carrying leaves into said portion 9.

The upper end wall of the housing 4 is generally designated 27, and is in upward and forward continuation of the rear wall 6, it being formed with successive generally downwardly opening arched sections 28, 29, 31, commencing at the upper end of rear wall 5, and that respectively extend horizontally between the upper ends of the sidewalls 7. These arched portions are progressively at higher levels, commencing with portion 28, and the uppermost portion 31 terminates about midway between the upper ends of the front and rear walls 5, 6, and a top wall section 32 extends forwardly and slantingly downwardly from said portion 31 to the upper edge of the front wall 5. It is then seen that said arched portions 28-31 extend substantially over the downwardly projecting portion 8 of housing 4 while the top wall section 32 extends over the cylindrical portion 9 that forms the forward part of the lower end wall of the housing 4.

Referring back to the lower cylindrical portion 9, and to FIG. 3, a horizontal pipe 33 of relatively small diameter, compared to the diameter of portion 9, is cut away at its upper side to form an elongated opening extending longitudinally of pipe 33. The sides of this opening are at opposite sides of pipe 33. Pipe 33 is longer than portion 9, and an opening extending longitudinally of portion 9 is cut out of its lower side. The pipe 33 and portion 9 are welded or otherwise suitably secured together along the edges of the openings that are formed therein, whereby an elongated, horizontally extending slot 34 (FIG. 3) communicates between the portion 9 and pipe 33 with the latter projecting below portion 9. The longitudinal axes of the portion 9 and pipe 33 are parallel, and the lower ends of sidewalls 7 extend over and close the ends of portion 9.

The opposite ends 35, 36 (FIG. 3) of pipe 33 project oppositely outwardly of the opposite lateral sides of housing 4.

Coaxially disposed within portion 9 is a horizontal shaft 37 (FIGS. 1, 3) supported at its ends for rotation in bearings carried by the downward extensions of sidewalls 7 that close the ends of the portion 8, and which bearings may include conventional packing glands to prevent leakage of air therepast.

Shaft 37 carries radially outwardly extending vanes 38 (FIG. 3) that, in turn, have flexible seals thereon in slidable sealing engagement with the cylindrical inner surface of portion 9, and with the end closure plates of portion 9 or downward extensions of sidewalls 7. Thus the shaft and vanes, including the sealing means on the latter, provide a rotary gate valve generally designated 39 that forms a seal between the pipe 33 and the interior of housing 4, and grapes are discharged by the rotation of the gate valve into pipe 33.

The end 35 of pipe 33 is connected by a conduit 41 (FIG. 1) with the upper portion of said vacuum tank 2, while the other projecting end of pipe 33 is connected by a pipe 42 with the upper wall of a cyclone separator 43, centrally thereof.

At the upper end of the rear wall 5 of housing 4 a generally horizontally extending conduit or pipe 44 extends to the side of the upper end portion of the cyclone separator 43, opening into the latter generally tangentially thereof. A pipe 45 connects pipe 42 with the upper end of the vacuum chamber, said pipe 45 connecting with pipe 42 at one of its ends at a point adjacent to the upper end of the cyclone separator. The opposite end of pipe 45 opens into the upper end of a side of the vacuum chamber generally tangentially thereof (as does the upper end of pipe 41) but is spaced around the tank relative to the upper end of pipe 41. A butterfly valve 40 is positioned within pipe 45 to regulate the flow of air therepast, which valve, as seen in FIG. 6, has a slotted crank arm pivotally connected to the upper end of an arm 40' that, in turn, is adapted to be reciprocably moved to actuate the valve, and nuts 40" threaded on arm 40' at opposite sides of a fixed lug 51, through which said shaft extends, are adapted to releasably lock said valve 40 in adjusted position. Any suitable means may be used to adjust the valve 40 and to hold it in adjusted position.

Supported within the housing 4 is an endless flight conveyor (FIGS. 1, 4) generally designated 46 having parallel, opposed, front and rear runs 47, 48 that extend slantingly upwardly and parallel with the front wall 5. Horizontal, parallel shafts 49, 50 at the upper and lower ends, respectively, of said conveyor are rotatably supported in bearings carried by sidewalls 7, and the upper and lower ends of the conveyor extend around said shafts. A pair of opposed endless sprocket chains 52 of said conveyor extend over a pair of sprocket wheels 53 secured on each of said shafts, and flight arms 54 spaced along said chains are secured at one of their ends to rods 54' extending between the latter.

In FIG. 1 the near sprocket chain 52 is indicated by a single broken or dotted line and each of the flights on the chain are indicated in a single broken line, while in FIGS. 4, 5 the chains and flights are more in detail. Each of the flights 54 may be a flat sided bar that is relatively thin in its horizontal dimension, and wider vertically, and a row of these bars are rigidly secured at one of their ends to each horizontal rod 54' (FIG. 5) that, in turn, is rigidly secured at its ends to similar opposed links of chains 52. The rods 54' are equally spaced around the chains 52.

The spacing between the flights 54 may be substantial, and the end flights of each row are preferably adjacent to and spaced from the sidewalls 7 a distance that is approximately the same as the spacing between the flights on each rod 54'.

As seen in FIG. 5 the upper baffle 30" has tongues or extensions 30a that are adapted to extend between the adjacent pairs of flights 54, and the distance between these extensions or tongues 30a and the flights of each adjacent pair is substantial, and may be several inches, so that grapes may freely drop between the flights and said extensions 30a, the latter being equally spaced between each adjacent pair of flights.

It should be noted that the said extensions 30a extend substantially to the lower shaft 50 of the flight conveyor, and as seen in FIGS. 4 and 5, an upwardly extending imperforate plate 60 that is parallel with forward wall 5 is secured at its lateral edges to end walls 7 and projects at its lower end between lower sprocket wheels 53 (FIG. 4) to join the outer ends of the tongues or extensions 30a. The rear runs 48 of the chains 52 are guided on the rear side of said plate 60, the latter terminating at its upper end adjacent to the upper sprocket wheels 53.

One end of shaft 49 projects outwardly of the sidewall 7 through which it extends, and has a sprocket wheel 55 secured thereto. Wheel 55 is connected by a sprocket chain 56 with a sprocket wheel 57 on a shaft driven by motor 58 through any suitable driving connection for actuating conveyor 46 for upward movement of the rear run 48 and for downward movement of the forward run 47. The flight arms 54 on the forward run will extend forwardly relative to the chains 52 of the forward run to substantially the forward sidewall 5 of housing 4, and said flight arms on both the rear and forward runs of the conveyor will move along paths parallel to the forward wall 5 of the housing. The flight arms on the rear run 48 of the conveyor will move around the upper sprocket wheels 53 to deliver leaves and the like to the inlet end of pipe 44 which is adjacent thereto and which inlet is substantially in opposed relation to the arms as they move around said upper sprocket wheels.

As seen in FIG. 1 the outer ends of the flights 52 in moving around the lower shaft 50 will almost engage the lower wall 12, and in moving about the upper shaft 49 they will almost engage the upper wall 32 and the section 31 of the rear wall. Thus the flights at the upper end of the conveyor will substantially scan the opening into conduit 44.

The lower shaft 50 also projects at one of its ends outwardly from one of the walls 7, and its projecting end has a sprocket wheel 59 secured thereon.

The shaft 37 of the gate valve 39 projects from one side 7 of the housing 4 and is connected with the low-speed shaft of a conventional speed reducer 61, which, in turn, has a high-speed shaft 62 connecting with sprocket wheel 63. A sprocket chain 64 connects sprocket wheels 59 and 63 so that the shaft 37, and consequently gate valve 39, will be rotated at a very low speed relative to the rate at which the flight conveyor is actuated.

At the lower end of the cyclone separator 43, a discharge conduit may be provided, having a rotary discharge valve 67 therein, similar to valve 39, so as to discharge waste from the separator while maintaining a partial vacuum therein or, if desired, any suitable closed collecting tank may be provided, which tank may be periodically emptied.

In operation, as the vehicle is moved down a row of grape vines, a partial vacuum is maintained in the tank 2, housing 4, and in the conduits 16, 17 that have the grape receiving nozzles 20, 25 at their outer ends.

As the grapes or berries are quickly drawn from vines, leaves and some stems may be drawn into said conduits 16, 17 and discharged with the fruit into the housing 4, the velocity of the grapes and leaves being retarded by the inverted U-shaped conduits 16, 17.

The baffle plates 30, 30' and 30" not only function to drain any juice from the fruit into the portion 9 over wall 12, but they also cause eddy currents at the point where the fruit leaves and stems enter housing 4 which will not prevent the heavier fruit from passing over the baffles into the portion 9, but will tend to separate the leaves and lighter material for being carried upwardly to the upper end of the housing 4.

Eddy currents, designated by the arrows 66 (FIG. 1) will tend to function to effect a further separation between any berries that may be carried upwardly with the leaves, so such berries will drop to be carried over the baffle plate for discharge into the portion 9 or will drop directly into said portion, but such berries will not be carried by the arms 54, since the latter are incapable of carrying more than stems and the leaves that hang from the stems.

On the other hand, the rear run 48 of the conveyor will carry the leaves and stems falling thereon to the upper end of the housing where pipe 44 opens into the latter, and the suction in said pipe, due to the partial vacuum existing therein, will draw the leaves and stems into the separator.

The function of the valve 40 is to provide the desired different partial vacuum relationship in conduits 41 and 44 so that the berries will be satisfactorily drawn through pipe 41 into the tank 2, while the leaves and trash will be carried into the cyclone, but not the berries, and a number of factors enter into the importance of making this adjustment.

When normally adjusted, there will be a down flow of air from the cyclone separator through the gate valve and an up flow of air in pipe 41 for carrying the grapes or berries to the tank 2, while a partial vacuum will be established in the housing 4 for carrying the stems and leaves through the pipe 44 into the cyclone separator without the berries or fruit.

Assuming the partial vacuum in tank 2 is equal to approximately 8 inches of mercury, which has been found to be a practical pressure, a vacuum of from 6 to 8 inches will exist at each of the grape receiving nozzles when in grape picking position with a bunch of grapes therein. The gate valve 39, of course, constitutes a partition at the lower end of the housing 4 and the conduits 41, 42 which respectively communicate at their upper ends with the vacuum tank 2 and the cyclone separator 43, and since conduit 44 communicates between the cyclone separator 43 and the upper end of housing 4, with no impediments therein, the main flow of air from the nozzles is through the housing 4 then through conduit 44, cyclone separator 43 and conduits 42, 33, 41 in succession with a sufficiently high velocity in conduit 41 to carry all of the grapes into the vacuum tank 2.

With this system only it has been found that the drop in the pressure in tank 4 and conduits 16, 17 between each grape plucking operation may be from approximately 8 inches of vacuum to approximately 5 inches, due to the sudden opening of the nozzles after the grapes have been withdrawn from the nozzles, and in the absence of the conduit 45 and the valve 40, the build up in the degree of vacuum in the housing 4 and conduits 16, 17 is materially slower than where this conduit and the valve therein is employed. Valve 40 is, of course, opened only a relatively small amount.

The conduit 45 opens into conduit 42 adjacent to the upper end of the cyclone separator, and thus is in a closer communication with housing 4 than is conduit 41 and functions to accelerate the build up of vacuum in housing 4 without impairing the effective flow of air through the conduit or pipe 33 and conduit 41 for carrying the grapes to the vacuum tank. It also may function to modify the air flow through housing 4 and conduit 44 should such air flow be such that grapes tend to be withdrawn through conduit 44.

It is seen that, in effect, the present invention provides in tank 2 a source of vacuum and a collector for grapes, the latter being adapted to be withdrawn from the tank through a valved outlet at its lower end, substantially as shown in said copending application for patent, the withdrawal of grapes being preferably at the winery or from a transfer point adjacent to the vineyard.

A main suction line connects the tank 2 with one or more intake nozzles such as 20, 25, and this suction line includes an enlarged portion thereof in the form of the housing 4, that extends generally vertically so the air in the suction line moves upwardly therein from an inlet at its lower end to an outlet at its upper end at a relatively low rate of speed insufficient to carry grapes to the outlet but adequate to carry leaves and stems thereto or that are brought within the influence of accelerated air flow adjacent to the outlet. The suction line continues from said outlet at an accelerated rate of speed to a second enlarged portion of the suction line that is in the form of a cyclone separator 43 wherein the leaves and stems fall by gravity, and from the upper end of this second enlarged portion of the suction line, the latter extends to the grape collector in the form of the length of pipe 33, which in itself forms part of the suction line, and to the vacuum tank 2, and the grapes in the collector or pipe 33 are carried by the suction line directly into the suction tank.

An auxiliary, valved suction line, in the form of the conduit 45 communicates with the main suction line at a point adjacent to the upper end of the cyclone separator to modify the suction characteristics of the portion of the suction line that is adjacent to the outlet from the upper end of the first mentioned enlarged portion of the suction line, or housing 4.

The inclination of the housing 4, the flight conveyor therein, the structure of the housing including the rotary gate valve 39 and its position are all desirable features of the invention. The cyclone separator may be conventional or an adaptation of a conventional separator for the present purpose. The tank 2 is of the type disclosed and described in detail in the aforementioned copending application.

The arrangement of the two inverted U-shaped conduits 16, 17 are quite desirable, as is the relationship between them and the flexible conduits 19, 24, both as to structure and relative diameters.

As a method, it is apparent that the conduit connecting each of the nozzles 20, 25 with the source of vacuum 3′ constitutes an elongated enclosed path of travel wherein the direction of movement of the air in said path is from said nozzles to said source of vacuum. The housing 4 represents an upwardly extending enlargement at a first point in said path wherein upward movement of the air is effected at a velocity that is insufficient to overcome the specific gravity of the grapes themselves, so the latter will drop by gravity at this point within said enlarged portion of the path of travel of the air to be collected in the lower end of said enlarged portion, while the leaves and stems will be carried to the upper end of the enlargement, or housing 4, where the velocity of the air in said path is increased by a restriction in the cross sectional area of said path, as represented by conduit 44 and said stems and leaves will be carried along said restricted portion of the path into another enlargement of said path represented by the cyclone separator 43. Here the leaves and stems will fall for collection and ejection from said path, but a final continuation of said path, which is again of restricted diameter, leads from said second enlargement or cyclone separator past said first point at an increased velocity and into said terminating receptacle or third enlarged portion of said path. The grapes that were collected in the first enlarged portion of said path are injected into said enclosed path of travel of the air at said first point into said final continuation of said path, and the air then carries the grapes into said third enlarged portion which is represented by the vacuum tank 2.

By this arrangement, the stems and leaves are separated from the grapes, but the grapes themselves are maintained all the while under the influence of the same source of means that drew the grapes into the conduit.

Valves 76, 77 respectively in conduits 16, 17 may close the system to maintain a partial vacuum in the various conduits and in housing 4, separator 43 and vacuum tank 2, if desired, when the nozzles are not being used and the vehicle is in transit to the winery or elsewhere, or suitable valves at any other positions in the system head of the vacuum tank 2 may be provided.

It is noted, of course, that some stems and leaves may fall in the housing 4, but these will be picked up by the flights 54 and will be carried upwardly to the point where they will be within the influence of the air where it accelerates in moving to conduit 44.

The invention is not to be considered as being restricted to the details in the foregoing description, since it is obvious that changes and modifications may be made without departing from the spirit of the invention and within the scope of the appended claims.

I claim:
1. The method of harvesting grapes that comprises the steps of:
   (a) providing a partial vacuum within an elongated enclosed path of travel that is open at one end and causing movement of air in a direction from said open end to the opposite end by connecting said opposite end with a constant source of vacuum sufficient to effect said movement of said air at a velocity adequate to move grape stems, leaves and grapes in said direction;
   (b) picking such grape stems, leaves and grapes from the vines by positioning the open end of said enclosed path over the bunches of grapes on the vines and thereafter moving them in said path and in said direction under the influence of air in said path;
   (c) causing upward movement of said air in said path for a predetermined distance at a first point therein that is insufficient to overcome the specific gravity of said grapes but that is sufficient to carry a substantial quantity of said stems and leaves for said predetermined distance whereby said grapes will fall by gravity and stems and leaves will continue in said path;
   (d) withdrawing said stems and leaves from said path at a second point therein that is spaced beyond said first portion, and then moving said air in said path free from said leaves beyond said second point and toward said source;
   (e) ejecting grapes that have dropped in said path at said first point into said path at a third point beyond said second point for movement in said path toward said source under the influence of said air on said grapes under a partial vacuum; then
   (f) collecting and maintaining said grapes in a group at a fourth point in said path for subsequent withdrawal from said path.

2. The method as defined in claim 1 that includes the step of:
   (b) reducing the velocity of said air in said path at said first and second and fourth points in said path, and maintaining an accelerated velocity of said air between said points and past said second point.

3. The method of separating grape stems and leaves from grapes when the latter are harvested for making wine that comprises the steps of:
   (a) moving said grapes, stems and leaves in one direction along an enclosed path of travel and under a partial vacuum in said path by connecting one end of said path with a source of vacuum and leaving the opposite end open, whereby said grapes, stems and leaves will be moved in said path toward said source;
   (b) collecting the grapes and the stems and leaves in order at two separate points in said path during movement of the grapes, stems and leaves, toward said source;
   (c) then and while maintaining said grapes under said partial vacuum, ejecting said grapes into said path at a point between said source of vacuum and the point at which said leaves and stems have been ejected, and again then
   (d) collecting said grapes in said path for temporary storage under said partial vacuum and for transfer to a winery.

4. Apparatus for harvesting grapes that comprises:
   (a) a conduit open at one end and a source of constant vacuum connected with the opposite end whereby grapes in bunches on the vines will be separated from the vines and drawn into said conduit for movement therein toward said source upon the open end of said conduit being positioned to substantially enclose such bunches;
   (b) said conduit including a stem and leaf separator comprising a housing forming an enlarged section of said conduit;
   (c) the first portion of said conduit between said housing and said open end opening upwardly into the lower part of said housing, and the second portion of said housing between said housing and said source opening into the upper part of said housing whereby the movement of air in said housing is generally upwardly;
   (d) grape collecting means in the lower part of said housing spaced from said first portion for collecting grapes drawn into said housing;
   (e) upwardly moving conveyor means within said housing extending into said upper and lower parts at its upper and lower ends for carrying into said upper part and to said second portion of said conduit such stems and leaves as may fail to be carried by air moving upwardly through said housing to said second portion;
   (f) stem and leaf collecting means in said second portion of said conduit for removing the stems and leaves from said second portion, and a continuation of said second portion extending from said stem and leaf collecting means to said source, including a grape storage tank;
   (g) grape removing means for discharging grapes directly from said grape collector into said continuation and for sealing said graps collector against admission of atmosphereic air at atmospheric pressure into said housing during said discharge, whereby grapes so discharged into said continuation will be carried in said continuation into said tank.

5. In a harvester as defined in claim 4:
   (h) said housing being vertically elongated, and said conveyor means including endless chains extending longitudinally of said housing having outwardly projecting horizontally spaced flights movable therewith and adapted to engage said leaves and stems;
   (i) said flights being horizontally spaced apart a substantially greater distance than the diameter of the grapes whereby they are inoperative for carrying grapes.

6. In a harvester as defined in claim 4:
   (h) means connecting said tank and the second portion of said conduit at a point between said stem and leaf separator and said housing for varying the velocity of the air in the said second portion of said conduit between said stem and leaf separator and said housing.

7. In a harvester as defined in claim 4:
   (h) said first portion of said conduit including a flexible length of reduced diameter extending to said open end and a rigid length of generally inverted U-shape form connecting said flexible length to said housing, whereby the rate of movement of grapes through said rigid length will be retarded.

8. Apparatus for harvesting grapes that comprises:
   (a) a conduit for air connected at one end with a constant source of vacuum and open at its opposite end for withdrawing grapes, from the vines, from bunches thereof including some leaves and stems on said bunches, under the influence of partial vacuum created within said conduit;
   (b) said conduit including a stem and leaf separator comprising a housing forming an enlargement of said conduit with a first portion of said conduit that is between said open end thereof and said housing opening upwardly into the lower end of said housing, and with a second portion of said conduit extending from said housing to said source and opening into the upper end of said housing whereby said grapes, stems and leaves will be drawn upwardly into said housing for movement toward said upper end;
   (c) grape collecting means at the lower part of said housing spaced from said first portion of said conduit for collecting grapes drawn into said housing; and (d) upwardly moving conveyor means within said housing extending between said lower and upper ends for carrying stems and leaves drawn into said housing to said second portion of said conduit for movement into said second portion under the influence of the partial vacuum therein from said source of vacuum;

(e) movable means actuatable for removing said grapes from said collecting means and for maintaining a seal between said collecting means and the atmosphere outside said housing during the actuation of said movable means for so removing said grapes; and (f) means connected with said movable means for actuating it for said movement.

9. Apparatus for harvesting grapes that comprises:

(a) a conduit for air connected at one end with a constant source of vacuum and open at its opposite end for withdrawing grapes, from the vines, from bunches thereof including some leaves and stems at said bunches, under the influence of partial vacuum created within said conduit;

(b) said conduit including a stem and leaf separator comprising a housing forming an enlargement of said conduit with a first portion of said conduit that is between said open end thereof and said housing opening upwardly into the lower end of said housing, and with a second portion of said conduit extending from said housing to said source and opening into the upper end of said housing whereby said grapes, stems and leaves will be drawn upwardly into said housing for movement toward said upper end;

(c) grape collecting means at the lower part of said housing spaced from said first portion of said conduit for collecting grapes drawn into said housing; and (d) upwardly moving conveyor means within said housing extending between said lower and upper ends for carrying stems and leaves drawn into said housing to said second portion of said conduit for movement into said second portion under the influence of the partial vacuum therein from said source of vacuum;

(e) said second portion of said conduit including a leaf and stem collector for collecting the leaves and stems entering said second portion and means for removing said leaves and stems therefrom;

(f) a continuation of said second portion extending from said collector past said grape collector and to said source of vacuum;

(g) grape removing means between said grape collector and said continuation of said second portion of said conduit for discharging grapes from said collector into said continuation, and for sealing said collector against admission of atmospheric air into said housing during such discharge;

(h) said continuation of said second portion of said conduit including an enlarged receptacle for collecting and holding said grapes at a point between said grape collector and said source.

10. In a grape harvesting apparatus that includes a constant source of vacuum, a conduit having a grape receiving nozzle at one end and connected at its opposite end with said source of vacuum, and which conduit includes an enlarged portion in the form of a vertically elongated housing having an inlet at its lower end and an outlet at its opposite end for respectively connecting with a first portion of said conduit leading to said nozzle and a second portion of said conduit leading to said source;

(a) said housing being inclined relative to vertical, whereby its upper end portion will be to one side of its lower end portion;

(b) a grape collector in said lower end portion offset to the same side of said inlet as said upper portion to receive grapes dropping from said upper portion;

(c) a generally vertically extending partition in said housing inclined in the same direction as said housing and having its lower end over said grape collector and having a generally upwardly facing surface for supporting and for directing grapes falling within said housing after passage through said inlet into said grape collector;

(d) a conveyor extending from said grape collector upwardly across said generally upwardly facing surface to a point adjacent to said outlet for carrying leaves and stems entering said inlet upwardly to said outlet, and (e) means connected with said conveyor for so moving it upwardly across said generally upwardly facing surface.

11. In the grape harvesting apparatus defined in claim 10:

(f) said second portion of said conduit including a cyclone separator depending therefrom into which said leaves and stems are adapted to fall;

(g) a continuation of said conduit extending from the upper portion of said cyclone separator to and past said grape collector, and (h) means for discharging grapes from said grape collector into said continuation.

12. In the grape harvesting apparatus as defined in claim 11:

(i) said grape collector comprising a horizontally elongated cylinder extending across the lower side of said housing and formed with an opening in its upper side through which said grapes are adapted to fall;

(j) a rotary discharge valve concentric with said cylinder having radially outwardly directed vanes in sealing engagement with the walls of said cylinder for successively moving grapes in said cylinder to the lower side thereof upon rotating said valve, and means connected with said valve for so rotating it;

(k) a discharge opening in the lower side of said cylinder;

(l) said continuation including a portion connected with said cylinder and extending along the lower side thereof and in communication with said cylinder through the opening in the lower side of the latter, whereby grapes discharged through said last mentioned opening will fall into said continuation of said conduit for movement therein toward said source.

13. In a grape harvesting apparatus as defined in claim 12:

(m) the portion of said conduit adjacent to said source being greatly enlarged to provide a storage tank for grapes, said tank being connected at the upper end thereof with said source.

14. In a grape harvesting apparatus that includes a generally vertically elongated housing, a pipe connected at one end thereof with the lower end of said housing and opening upwardly into said housing at said one end and having a grape receiving nozzle at its opposite end, a conduit connected at its upper end with the upper end of said housing and opening into said last mentioned upper end of said housing, a constant source of vacuum connected with the other end of said conduit, and the portion of said conduit adjacent to said source of vacuum being a relatively large storage tank for grapes adapted to be moved through said housing and conduit toward said source of vacuum under the influence of air moving through said conduit, the improvement that comprises:

(a) grape collecting means at the lower end of said housing for collecting grapes moved through said pipe into said housing;

(b) said conduit including a first portion thereof communicating between the upper portion of said housing and said grape collecting means and means for discharging grapes from said grape collecting means into said first portion;
(c) said conduit further including a second portion thereof communicating between said grape collecting means and said storage tank for movement of grapes ejected into said first portion to said tank;
(d) means for varying the vacuum in said housing comprising a pipe communicating between said first portion of said conduit at a point adjacent to the upper end of said housing; and
(e) a control valve in said last mentioned pipe for controlling the volume of flow of air therepast.

References Cited by the Examiner

UNITED STATES PATENTS

| | | |
|---|---|---|
| 661,166 | 11/1900 | Boyd. |
| 2,471,326 | 5/1949 | Hoyt. |
| 2,826,205 | 3/1958 | Eissman _____ 131—146 |

FOREIGN PATENTS 557,845   5/1923   France.

ABRAHAM G. STONE, *Primary Examiner.*

P. A. RAZZANO, *Assistant Examiner.*